(12) United States Patent
Mahajani et al.

(10) Patent No.: US 10,649,822 B2
(45) Date of Patent: May 12, 2020

(54) EVENT INGESTION MANAGEMENT

(71) Applicant: HEWLETT PACKARD ENTERPRISE DEVELOPMENT LP, Houston, TX (US)

(72) Inventors: Saket M. Mahajani, Santa Clara, CA (US); David Rodrigues Pinheiro, Santa Clara, CA (US); Suresh Ramamurthy, Dublin, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 101 days.

(21) Appl. No.: 16/023,141

(22) Filed: Jun. 29, 2018

(65) Prior Publication Data

US 2020/0004607 A1    Jan. 2, 2020

(51) Int. Cl.
    *G06F 15/173*     (2006.01)
    *G06F 9/54*     (2006.01)
    *H04L 12/24*     (2006.01)
    *H04L 12/26*     (2006.01)
    *H04L 12/863*     (2013.01)
    (Continued)

(52) U.S. Cl.
    CPC ............ *G06F 9/542* (2013.01); *G06F 9/4881* (2013.01); *H04L 41/046* (2013.01);
    (Continued)

(58) Field of Classification Search
    CPC ....... G06F 9/542; G06F 9/4881; H04L 43/16; H04L 47/6275; H04L 47/6225;
    (Continued)

(56) References Cited

U.S. PATENT DOCUMENTS 7,484,011 B1    1/2009   Agasaveeran et al.
8,966,074 B1    2/2015   Richards et al.
(Continued)

FOREIGN PATENT DOCUMENTS

EP     1553740 A1     7/2005

OTHER PUBLICATIONS

Kasera, S. et al., "Robust Multiclass Signaling Overload Control," IEEE, Nov. 6-9, 2005, pp. 246-258, https://ieeexplore.ieee.org/abstract/document/1544625.
(Continued)

*Primary Examiner* — Liang Che A Wang
*Assistant Examiner* — Johnny B Aguiar
(74) *Attorney, Agent, or Firm* — Nolte Intellectual Property Law Group

(57) ABSTRACT

A network communication device executes both a service function related to processing network traffic and a lower priority monitoring function. The network device performs an event ingestion throttling method to process events while deferring to the higher priority function. The method includes obtaining an event for a first queue from a plurality queues the event responsive to a change in a local database of the network communication device. Determining if an event queue entry is available or if the event queue is full. Determining if a total of in-use queue entries is higher than a threshold. Using an event scheduler monitor function to determine whether or not to initiate throttling of events for the monitor function in favor of the service function based on a combination of either individual queues becoming full or a backlog across all queues representing a reason to initiate throttling.

20 Claims, 10 Drawing Sheets

(51) Int. Cl.
*H04L 12/865* (2013.01)
*G06F 9/48* (2006.01)
*H04L 12/835* (2013.01)
*H04L 12/801* (2013.01)
*H04L 12/823* (2013.01)

(52) U.S. Cl.
CPC .......... *H04L 41/0681* (2013.01); *H04L 43/04* (2013.01); *H04L 43/16* (2013.01); *H04L 47/6225* (2013.01); *H04L 47/6275* (2013.01); *H04L 47/10* (2013.01); *H04L 47/29* (2013.01); *H04L 47/30* (2013.01); *H04L 47/32* (2013.01)

(58) Field of Classification Search
CPC ... H04L 43/04; H04L 41/046; H04L 41/0681; H04L 47/10; H04L 47/29; H04L 47/30; H04L 47/32
USPC .................................. 709/223, 224; 370/235
See application file for complete search history.

(56) References Cited

U.S. PATENT DOCUMENTS

| | | | |
|---|---|---|---|
| 9,965,330 B2 | 5/2018 | Bishop et al. | |
| 2003/0135639 A1 | 7/2003 | Marejka et al. | |
| 2006/0164979 A1* | 7/2006 | Pirbhai | H04L 43/02 370/229 |
| 2010/0091676 A1* | 4/2010 | Moran | H04L 47/10 370/252 |
| 2013/0054901 A1 | 2/2013 | Biswas et al. | |
| 2013/0201828 A1* | 8/2013 | Masputra | H04L 47/60 370/232 |
| 2017/0228253 A1 | 8/2017 | Layman et al. | |

OTHER PUBLICATIONS

Rajrup Ghosh et al, Distributed Scheduling of Event Analytics Across Edge and Cloud (Research Paper), Dec. 9, 2017, 29 Pgs.

* cited by examiner

EVENT INGESTION MANAGEMENT

BACKGROUND

In the field of network monitoring, devices dispersed throughout one or more networks may monitor device statistics and provide either individual device statistics or network-based statistics in real-time (or near real-time) to a central repository or collection and correlation. In different monitoring environments, different amounts of processing happen at the device that is initially collecting the metric (e.g., device statistic). After or as part of collection, some amount of processing may happen locally at the collecting device prior to transmission to the central repository (or storing locally in some configurations). Of course, different networks (e.g., subnets) may be partitioned such that there are different places where historical monitoring data may be stored. For example, each network portion (e.g., subnet or set of subnets) of a corporate network may feed all of the data collected for that network portion to a single repository (e.g., designated to be associated with that network portion). In other cases, data may be stored locally on each device and periodically gathered for analysis. In yet another case, there may be a single comprehensive repository for all metric data. Many different configurations are possible.

Metrics collected may represent the state of the device (e.g., CPU utilization, dropped packets, active sessions, denied packets, etc.) or may represent the state of the network (e.g., packet collisions, network throughput, percentage of broadcast packets, etc.). Also, monitors may be in place to issue events or alerts. In the case of alerts, they may be issued based on detection of a network occurrence (e.g., router unreachable, DNS service not available, etc.) or a monitored metric crossing a threshold (e.g., CPU utilization over 80%, available storage under 20%, etc.). In the case of events, the data may simply represent a current value that may be monitored to collect time series data and the event may be generated based on a value change or periodically at different time internals (or a combination of both). Monitors represent computer processes that, as the name implies, track a value and may have knowledge of what that value (e.g., of a metric) should typically be. Monitors may react to instantaneous metric values or metric values over a period of time. In any case, monitors may be in place to assist network administrators maintain the quality of service of the network (e.g., uptime, performance).

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than shown or possibly in parallel with each other. For a detailed description of various examples, reference will now be made to the accompanying drawings, in which.

DETAILED DESCRIPTION

Figure 1:
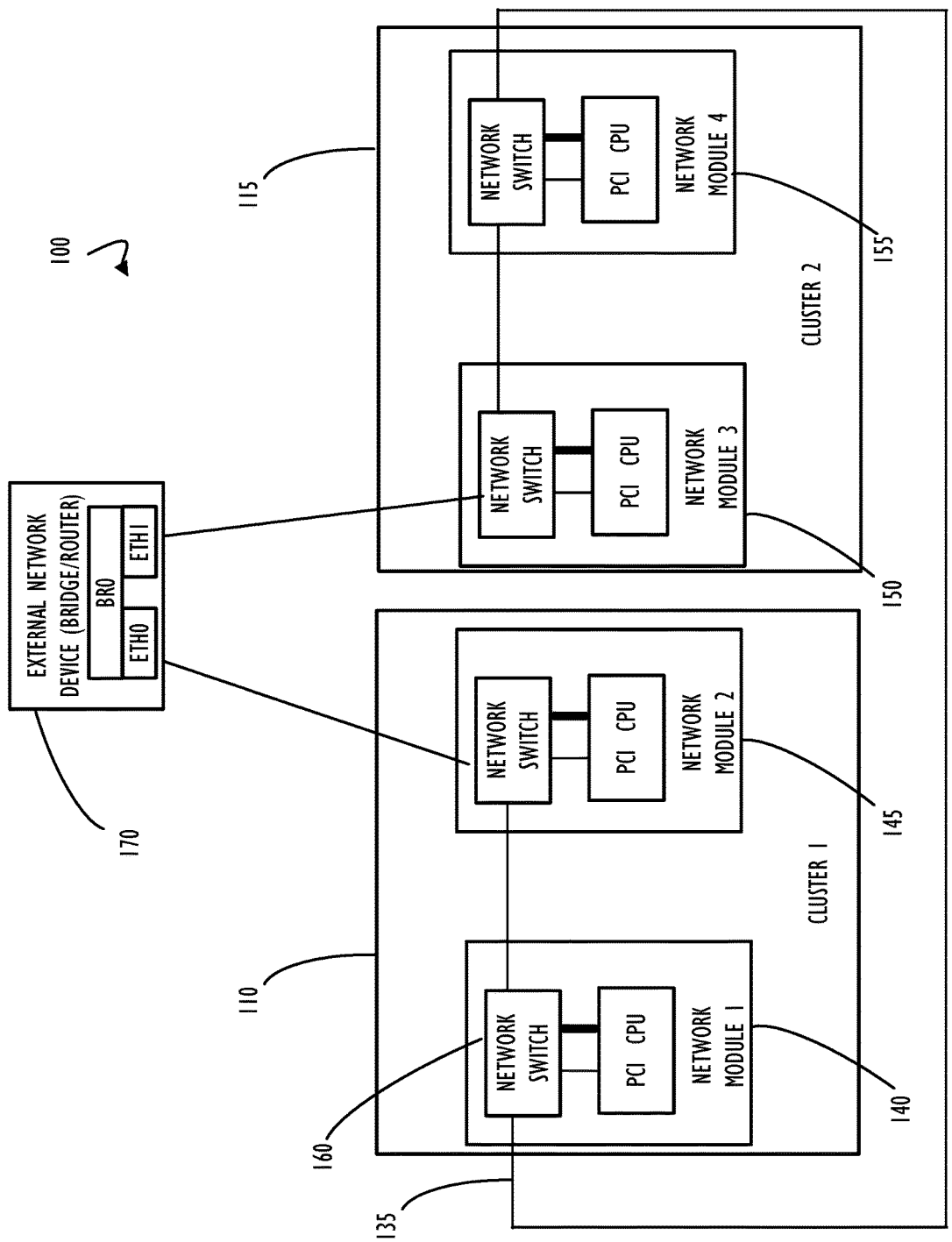
FIG. 1 is a functional block diagram representing an example of different network communication devices including a bridge/router and two network switches for each of two independent frames (or similarly configured blade resources), according to one or more disclosed implementations.

Examples of the subject matter claimed below will now be disclosed and then a specific non-limiting implementation will be explained with reference to the FIGs. In the interest of clarity, not all features of an actual implementation are described in every example of this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

In the field of network computing, network connectivity between devices, compute nodes, blades, or frames of a scalable compute resource may be implemented using a network communication device. Network communication devices, such as switches, routers, hubs, bridges, etc. represent a primary communication path for sharing data between different types of compute resources generically referred to as "nodes" of a network. The shared data may represent inputs to compute processes (e.g., data or applications), outputs of compute resources (e.g., compute results), communications to coordinate distributed processes, communications between users, and other types of data. In any "intelligent" network communication device, there may be a processor, local memory, configuration information, and "current state" information, among other types of information. Collectively, the different types of information on a network device may be considered to represent the overall "device state" at a given point in time. For example, information on a network communication device (including its "device state") is expected to change over time, in part, because while in-service and providing active communication paths for a network, the overall configuration and available devices on that network may change.

In general, a switch may be thought of as a device in a computer network that connects together other devices ("nodes" of the network). Multiple data cables may be plugged into a switch to enable communication between different networked devices. Switches manage the flow of data across a network by transmitting a received network packet only to the one or more devices for which the packet is intended. Each networked device connected to a switch can be identified by its network address, allowing the switch to direct the flow of traffic, possibly in an effort to maximize the security and efficiency of the network. A switch is more intelligent than a hub (e.g., Ethernet hub), which simply retransmits packets out of every port of the hub except the port on which the packet was received. In most cases, a hub is unable to distinguish different recipients, and therefore may have an overall lower network efficiency, but simpler configuration information, than a switch/router. Generally, a router is a networking device that forwards data packets between computer networks. Routers perform the traffic directing functions on the Internet. A data packet is typically forwarded from one router to another router through the networks that constitute an internetwork until it reaches its destination node.

Switches, hubs, Routers, etc. are examples of network communication devices that may benefit from the concepts of this disclosure. Other examples of network communication devices that may also benefit include, but are not limited to: wireless access points, remote access servers, bridges, brouters, etc. Also, some network communication devices do not fit into a single classification and may be hybrids of two classes of devices (e.g., a brouter is a bridge-router hybrid). In general, this disclosure represents an improvement to the art of network computing by providing enhanced diagnostic information that may be used to improve performance, security, and reliability of a network (e.g., a corporate infrastructure network).

To address implementations of an embedded processing environment of a network communication device participating in a monitoring solution, resource constraints may play a role in what monitoring events are processed and which data may be ignored. Ignoring of data may not be desirable and steps may be taken to minimize the amount of ignored data. However, the primary function of a network communication device (e.g., switch, router, bridge) is to provide connectivity for connected devices that are communicating through that network device. Accordingly, collection of historical metrics for analysis, while important, may have to be deferred (or lost) in times of network stress. Disclosed implementations represent an improvement to the art of network management, in part, by introducing event inges-tion management techniques that may be used to obtain as much monitoring data as possible while properly recognizing that primary communication functions may take priority for available resources.

The embedded processing environment of a network communication device may be constrained to processing and memory resources available on that network device. That is, a network communication device will have a pre-determined and finite set of local resources that may be used to implement the processing functions of that network communication device. Different network communication devices may have different amounts of local processing capability (e.g., number of processors and number of cores on each processor) and local storage (e.g., volatile or non-volatile memory). In practice, each of these devices is deployed based on requirement specifications determined by their function as a network communication device and may not account for any additional processing. As a result, adding monitoring functions to an already deployed network communication device may introduce an additional load that was not planned for ahead of deployment. Accordingly, disclosed techniques include methods to perform monitoring in a comprehensive manner when embedded resources are available and gracefully decrease monitoring functionality when the limited embedded resource of the device are not available (i.e., have become required for higher priority network communication functions).

Event ingestion refers to the capability of a device or system to "take-in" events and process them in an orderly fashion. In an example implementation of the disclosed event ingestion management techniques, a network analytics engine (NAE) may represent a functional component (e.g., process or module executing on a processor of the device) of a network communication device that provides monitoring capability as opposed to performing a network communication function. That is, an NAE, in some implementations, may be concerned with capturing metrics and responding to events rather than passing data from one network connected device to another. This NAE feature may be implemented as a feature of the operating system (OS) executing on the network device or may be implemented as a separate functional component (e.g., application loaded by OS, shared library, etc.). In some implementations, part of all of an NAE infrastructure may be implemented as a cloud application (e.g., software as a service SAAS). The NAE may enable a user, such as a system administrator, to monitor any network state of the device on which it is executing by listening on state changes (e.g., event generation) on the central internal database of the device (e.g., network communication device). This central internal database (and information exchange with that database) is sometimes referred to as an extended Open vSwitch Database Management Protocol (OVSDB). As used in this example, "listening on state changes" generally refers to a technique for event generation that may be used in some implementations. In one example, a listen on state change means that nothing will happen as long as the state (e.g., database value) is not changed. Upon change, however, an activity will be initiated by whatever process is "registered to listen" for that change.

There may be many ways to implement this type of "listen on change" functionality. For simplicity, this disclosure will simply refer to this as an "event generation" where events are associated with a queue, such that, when a database value is changed, a corresponding event is generated and associated with a particular monitoring queue. Other implementations are possible, but the point is there is an associated function/process that may be notified to react to, and process, data value changes. There may be as many different functions/processes as there are data values being monitored, or their may be some functions/processes that are associated with multiple data values. Many combinations and permutations are possible based on design considerations. In some cases, a different function/process may be initiated for a given metric based on the current value of that metric. For example, if the value of the metric is above a threshold a different function may be invoked than if the value of the metric is within normal operating parameters.

In one example implementation, the NAE may allow a user to build a time-series history of network states. This time-series data may then enable further analytics and troubleshooting. For example, by having statistics captured prior to a network interruption, a post-failure analysis may determine the root-cause of the network failure. In general, monitored state change events could occur infrequently, at a sustained pace, or might burst all at once (e.g., at a time of network failure many additional events may be generated). Accordingly, the example NAE application may utilize disclosed event ingestion management techniques to receive and process (e.g., ingest) such events and safeguard the system against consuming too many resources for event monitoring over network processing functions.

Figure 4:
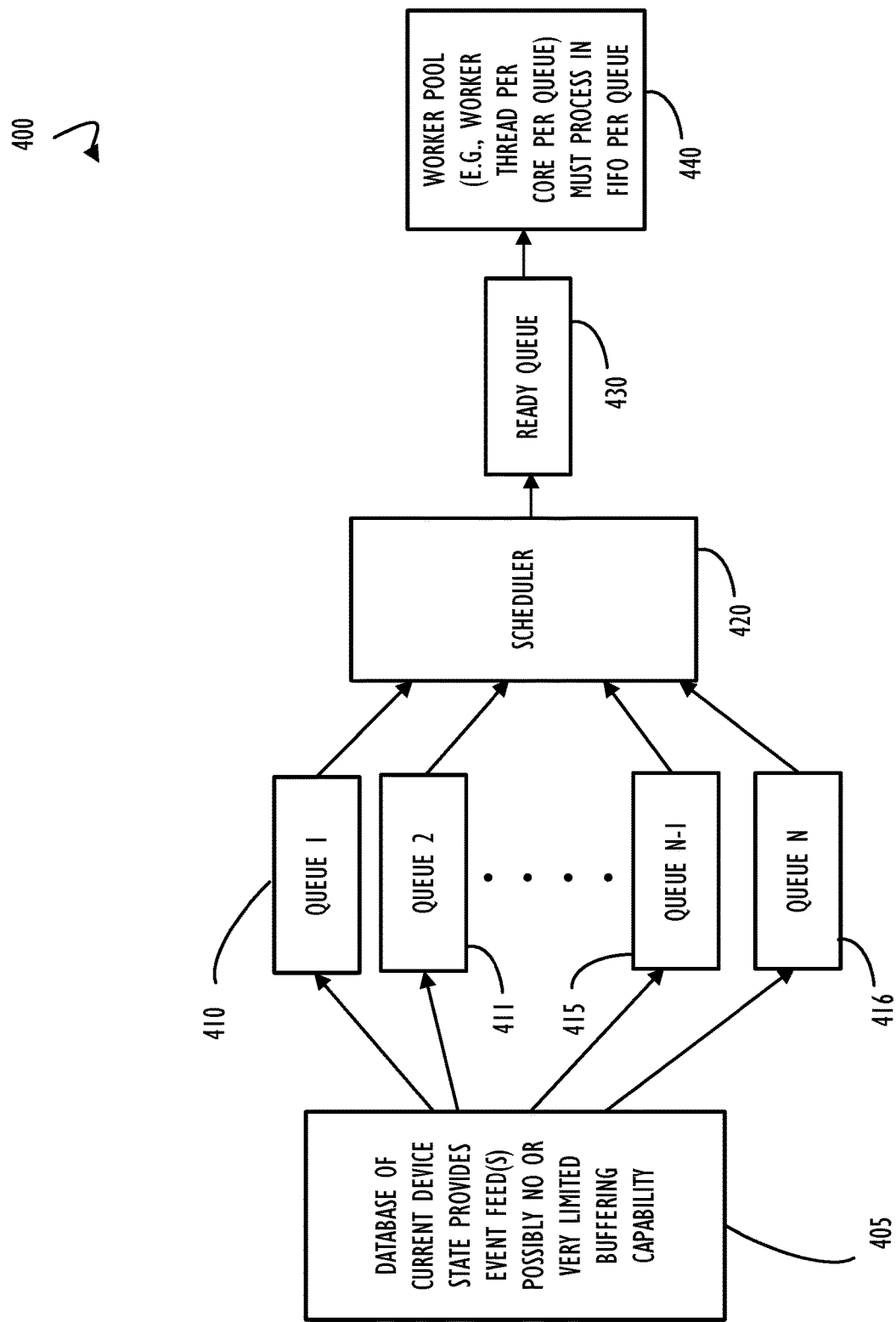
FIG. 4 is a block diagram representing details of one example event monitor scheduler functional component and a control flow for processing events on embedded resources of a network communication device, according to one or more disclosed implementations.

To more fully utilize all available resources within an embedded system, the NAE architecture may take advantage of any available multi-core architecture and perform parallel processing of event queues, for example. However, processing events in parallel may introduce an additional design challenge for the example NAE, in part, because the NAE may be required to maintain a first-in-first-out (FIFO) order of events. In other words, if events are processed out of the order in which they occur, then collected data may not be meaningful when used for later analysis. Accordingly, the disclosed event ingestion management, as implemented in the example NAE of this disclosure, addresses this (and other) design challenges by using an ingestion pipeline (one example ingestion pipeline is illustrated in FIG. 4 and discussed below).

In one example implementation of an NAE, each monitor has its own separate and dedicated event queue. Events for a particular queue may be guaranteed to be processed in order (i.e., FIFO) by ensuring that no new event from the same queue has its processing initiated while an event for that same queue is still being processed. This implementation allows for parallelism (e.g., parallel processing) at the granularity of an event across each of the different monitors. That is, multiple monitors may be executing concurrently on different cores but serially with respect to incoming events for each monitor. In an implementation where more monitors exist than there are cores available for processing, each of the events may be retrieved for processing in a round-robin manner to not ignore any particular monitor and give all queues equal priority weights.

In an alternative to round-robin equal weighting of queues, some monitors (and their queues) may be prioritized over others. Prioritization may be implemented in many different ways. For example, prioritization may be implemented by allowing a high-priority monitor to have a dedicated core (e.g., dedicated worker thread on a given core) while designating two lower priority queues to share a worker thread on a core. Also, selection of which queue to associate with which core may have an effect on processing performance. If a particular core normally has more idle-time than other cores, a high-priority monitor's queue event may be assigned to a worker thread on that core to have a greater chance of receiving processor resources when an event arrives. In some instances, CPU utilization over a recent period of time may be used to implement prioritization. This scheme may favor a more recently underutilized core over a core that has recently been busy, because the recently busy core may still be processing some complex task and only had a momentary idle period.

Prioritization may also be implemented when using a scheduling technique other than round-robin. For example, event scheduling could always begin at queue 1 and start at queue 1 for every scheduling pass such that no event on a low number queue would wait long for scheduling while events on higher queues would be given a lower priority (e.g., because the scheduler will not get to them until all lower numbered queues are either idle or being serviced). This designation of low queue numbers for high-priority is arbitrary and could be reversed or altered. In any case, the same effect of having some queues processed by the event scheduler more frequently than others would result. Thus, giving more frequently processed queues a higher priority than those less frequently processed.

Prioritization of monitors and queues for a network communication device may be implemented by an application program interface (API) or shared library. In this manner, the priority scheme could be updated without significantly changing other portions of code executing on the network communication device. By having the priority technique used for scheduling architected as a "pluggable" component (e.g., via API or shard library) the priority selection could be selectively replaced for different devices (or for different periods of time). Some devices may be executing round-robin while for selective use-cases other schemes may be used.

In any case, independent of a prioritization scheme, actual processing for a set of queues may be performed in parallel by a worker pool of light-weight threads. In one implementation, the pool may be set to size N, where N=number of cores available for threads. As each event is published to a queue (e.g., added to a queue by a listener), that event is visible to the scheduler for dispatching. Next, the scheduler may add that event (and any other corresponding information such as a callback) to a ready queue to be processed by a free thread from the pool. In this manner, events may be passed to appropriate worker threads (or other processing functions) to be serviced. A callback may optionally be used for some events or queues as a notification to indicate completion of processing of a particular event.

Using all or part of the above techniques, a queue processing model for event ingestion may allow for throttling of faulty or unsupported publishers that might otherwise flood the system. Based on a variety of system and stress tests performed in a lab, default values may be set for these throttling mechanisms that have been calibrated across various supported devices running the disclosed NAE. These default values may be changed by a system administrator in cases where they are implementing a non-standard network architecture. Also, different throttling mechanisms may be adjusted at run-time or based on analysis of historical data collected by the aforementioned monitors.

In one example implementation, throttling may occur based on at least three loosely independent parameters. First, by a rate of incoming notifications per monitor. That is, a rate may be calculated as number of notifications received for a monitor within a given period of time. If the rate per period is higher than a threshold, the first parameter may indicate that throttling may need to be initiated. Second, by a queue size of an individual monitor. That is, if a particular monitor is filling its queue this single monitor may represent an indication that throttling may need to be initiated. Third, by a total size of all unprocessed notifications across all monitor queues. That is, a sum of all unprocessed events may exceed a threshold and thus provide an indication that throttling may need to be initiated. Thresholds may be configurable and, as mentioned above, may have a default value based on stress tests run on typical deployed topologies to allow for the most efficient throttling.

In some implementations, throttling may be initiated immediately upon any one of the above three parameters providing an indication to initiate throttling. In other implementations, two of the three parameters are required prior to initiating throttling. Thus, when to initiate throttling may be tunable for a given network communication device. In any case, once throttling is initiated, the system may go into a state of "stress" for a particular monitor, set of monitors, or all monitors. When in the stress state, no new events may be published to the queue under stress until all existing queue entries have been processed and that queue becomes empty. In this manner, a backlog of all outstanding queue requests, either for the entire device or for a given queue, may be allowed to complete processing with no new events being added to the backlog.

When in a state of stress, monitoring data may be lost but that condition may be deemed desirable over the alternative of consuming too many resources from the limited set of embedded compute resources available on a network communication device. As should be clear from this disclosure, setting the throttling thresholds low on a device would configure that device to only perform monitoring when there are ample system resources. In contrast, a device configured with high throttling thresholds will continue to provide monitoring even when the network communication device becomes busy and only stops monitoring when multiple queues are backlogged. Intermediate settings are also possible.

Based on the above overview, it should be clear that problems addressed by this disclosure include a balance of limited resources within a network communication device between a monitoring function (secondary priority) and a network communication function (primary priority). Further, different types of events may be prioritized over others. In short, the disclosed event ingestion techniques and configurable thresholds may allow for optimizing use of available resources without impacting a primary function of a device.

Although these examples have been illustrated for a network communication device, other devices exist where there may be limited embedded processing resources are available and monitoring (at least some of the time) is desirable. Those types of devices may benefit from the disclosed techniques because they could be configured to perform monitoring for times of low activity and quickly reach a monitoring stress condition so as to not impact their primary design function.

Having an understanding of the above overview, this disclosure will now explain a non-limiting but detailed example implementation. This example implementation is explained with reference to the figures and includes: different example devices that may benefit from the above event ingestion management techniques (FIGS. 1-2); a specific example device implementation (FIG. 3); an example functional process flow for processing and scheduling events (FIG. 4); an example method for adding events to queues (FIG. 5); an example method for stress throttling (FIG. 6); an example event ingestion management method (FIG. 7); an example processor and computer-readable medium to implement the example event ingestion management method (FIG. 8); an example system of a network of computers where event ingestion management may be implemented (FIG. 9); and an example processing device that may be used in one or more devices that may implement the disclosed event ingestion management techniques or on devices set up to support those devices (FIG. 10).

Referring now to FIG. 1, computer infrastructure 100 illustrates a set of computer devices, each containing at least one network communication device. In this example, network module 1 (140) through network module 4 (155) each represent a network communication device that may be part of a larger device. In this case, the larger device may be a hyperconverged node of a cluster or possibly a frame of a scaleable compute resource. Also, in this example, network device 170 illustrates a stand-alone network device such as a bridge or a router. In the context of this disclosure, a network communication device may exist independently or be part of a larger system and still have a limited amount of embedded resources that may benefit from the disclosed event ingestion management technique.

In computer infrastructure 100, network communication device 170 has a primary function of providing connectivity between independent network frames or possibly independent clusters of compute resources (e.g., cluster 1 110 and cluster 2 115). Note, in the example of FIG. 1, the links between cluster compute resources Cluster 1 (110) and Cluster 2 (115) (specifically between Network Module 2 (145) and Network Module 3 (150)) do not represent a direct connection because they pass through network communication device 170. Cluster 1 (110) and Cluster 2 (115) may be thought of as independent but related cluster resources.

For example, Cluster 2 (115) may be configured as a "hot backup" to Cluster 1 (110). Communication path 135 may provide communication directly between Cluster 1 (110) and Cluster 2 (115) to support exchange of role information and heartbeat information as appropriate. Further, in this scenario, an external network communication device 170, such as bridge/router, has been inserted to form a communication path between distinct compute resources and possibly provide additional communication to other devices (not shown) and networks (not shown). Accordingly, the state of external network device 170 may, at some point, require trouble shooting (or monitoring) and the event ingestion techniques of this disclosure may assist in collecting information to assist that effort.

As illustrated in FIG. 1, a computer infrastructure 100 may include a plurality of different types of network devices (e.g., switch, router, bridge, etc.) that may all benefit from the disclosed techniques of event ingestion management. Accordingly, examples of this disclosure are not limited to any particular type of network connectivity device and may be applicable to any network communication device that maintains an internal "state" of processing or connectivity when performing its function. In the example of FIG. 1, network devices with state include each instance of network switch 160 and external network device 170. A device with a strict hardware only coupling, where no processing takes place, may not be a candidate for event ingestion, because there may be no local "event" capture possible. However, any device that maintains internal adjustable configuration information may be considered to have a "state" for which an event and corresponding processing may take place in accordance with this disclosure. In cases where a device does not include internal memory, the event may be captured and processed externally to that device, but throttling techniques may not be applicable to that particular device.

Monitors may be set up based on a network protocol, hardware resource, software resource, etc. For example, a monitor may be established to monitor available memory and CPU utilization. A monitor may also watch for a protocol specific state, such as, how many open shortest path first (OSPF) "hello" packets have been received from other devices. A monitor may identify that the rate of a particular port on a switch goes up and down too frequently and therefore may need a hardware adjustment (e.g., may have a loose or defective cable). Monitors may process idle script errors to identify a software process that is not functioning properly. Monitors may work with real-number metrics, enums, lists, or threshold crossing flags (among other types of data). In general, monitors may be used to build a history of the state of a network communication device and a particular parameter of that network communication device over a period of time that may assist in maintaining an associated network infrastructure. This period of time may be on the order of minutes, days, weeks, or months, depending on the type of data being analyzed. No specific time period is required for any particular monitoring capability, although some parameters may change in a manner where different periods of monitoring time are more appropriate than others.

Figure 2:
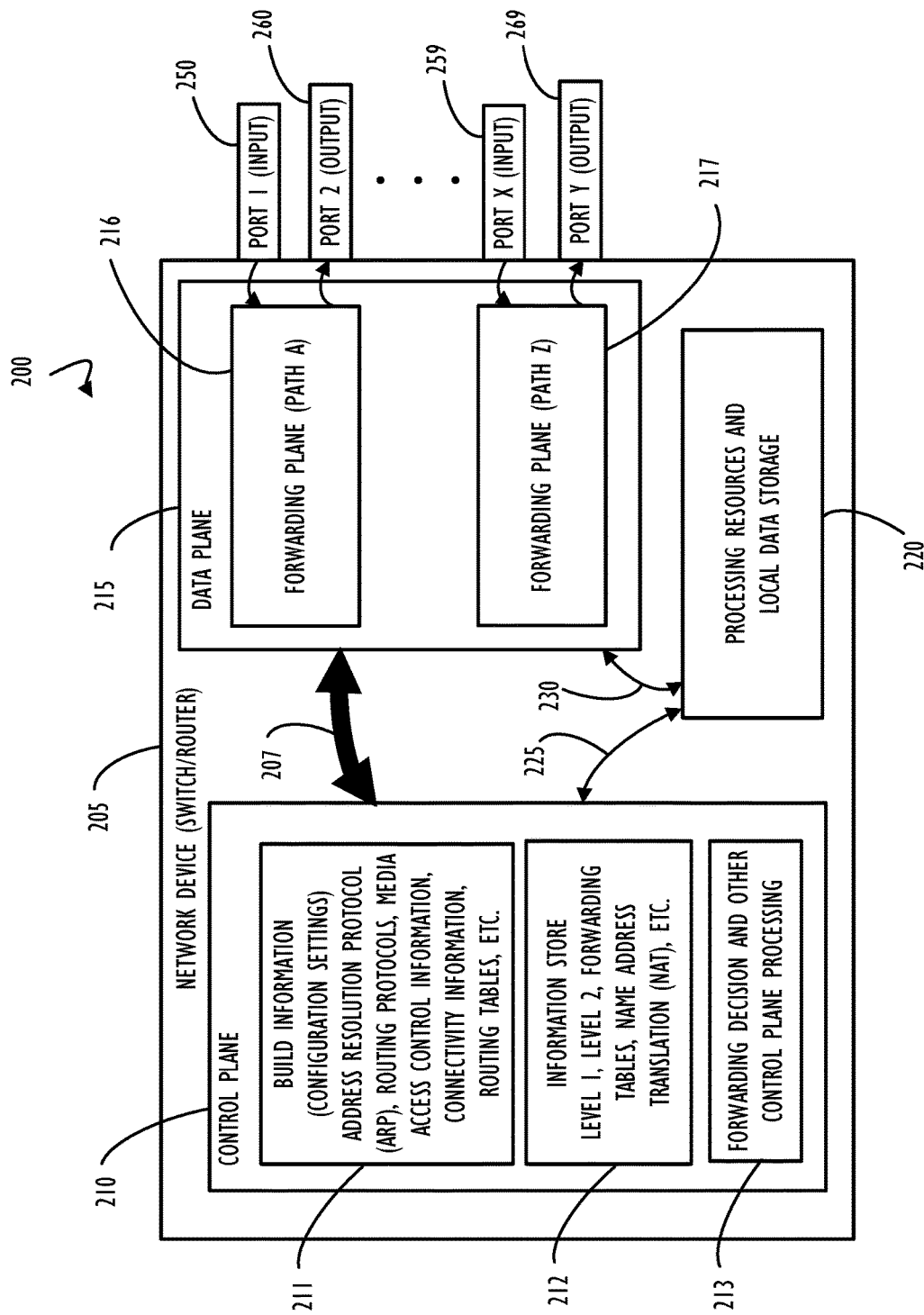
FIG. 2 is a functional block diagram representing a first example of a network device and possible functional components (logical and physical) of the network device, according to one or more disclosed implementations.

Referring now to FIG. 2, a network communication device such as a switch/router 205 is illustrated in block diagram 200. In general, a router has two types of network element components organized onto separate planes illustrated as control plane 210 and data plane 215 in block diagram 200. In addition, a typical switch/router 205 may include processing resources and local data storage 220 that may include local processing and configuration metrics for the network device. Depending on the capabilities of a particular network device, different types of processing resources and local storage may be present. In general, higher capacity network device implementations will include substantial processing resources and memory while simpler (e.g., low capacity) devices will contain less internal resources. In any case, as mentioned above, processing resources for a network communication device are typically provisioned based on a planned network need and may not have much unused capacity for other functions (e.g., monitoring).

Control plane 210, for example in a router such as switch/router 205 may be used to maintains routing tables (or a single comprehensive routing table) that list which route should be used to forward a data packet, and through which physical interface connection (e.g., output ports 260 through 269). Control plane 210 may perform this function by using internal preconfigured directives, called static routes, or by learning routes dynamically using a routing protocol. Static and dynamic routes may be stored in one or more of the routing tables. Static routes are typically pre-configured and may be considered as one or many possible network device database settings for possible monitoring. Thus, a change to an existing route or an addition of a route may trigger an event that requires ingestion by the monitoring system. The control-plane logic may strip non-essential directives from the table and build a forwarding information base (FIB) to be used by data plane 215.

A router may also use a forwarding plane (e.g., part of the data plane 215) that contains different forwarding paths for information from different ports or different destination addresses (e.g., forwarding path A 216 or forwarding path Z 217). In general, the router forwards data packets between incoming (e.g., ports 250-259) and outgoing interface connections (e.g., ports 260-259). The router forwards data packets to the correct network type using information that the packet header contains matched to entries in the FIB supplied by control plane 210. In some network implementations, a router (e.g., switch/router 205) may have interfaces for different types of physical layer connections, such as copper cables, fiber optic, or wireless transmission. A single router may also support different network layer transmission standards. Each network interface may be used to enable data packets to be forwarded from one transmission system to another. Routers may also be used to connect two or more logical groups of computer devices known as subnets, each with a different network prefix.

Also illustrated in FIG. 2, bidirectional arrow 207 indicates that control plane 210 and data plane 215 may work in a coordinated fashion to achieve the overall capabilities of a network device such as switch/router 205. Similarly, bidirectional arrow 225 indicates that processing and local data storage resources 220 may interface with control plane 210 to provide processing and storage support for capabilities assigned to control plane 210. Bidirectional arrow 230 indicates that processing and local data storage resources 220 may also interface with data plane 215 as necessary.

Control plane 210 as illustrated in FIG. 2 includes several example functional control blocks. Additional control blocks are possible depending on the capabilities of a particular implementation of switch/router 205. Block 211 indicates that control plane 210 may have associated build information regarding a software version of control code that is currently executing on switch/router 205. In addition, that software version may include configuration settings to determine how switch/router 205 and its associated control code perform different functions. Many different configuration settings for both the software and the device itself are possible and describing each is beyond the scope of this disclosure. However, the disclosed event ingestion techniques may be designed to capture changes to as many of these configuration settings and other run-time metrics as desired to accurately provide a historical view for a network device state. Block 211 further indicates that different types of routing information and connectivity information may be known to switch/router 205 and control plane 210. Block 212 indicates that an information store may be accessible from control plane 210 and include forwarding tables or NAT information as appropriate. Block 213 indicates that control plane 210 may also be aware of forwarding decisions and other processing information. Although FIG. 2 illustrates these logical capabilities within control plane 210 they may actually be implemented outside of, but accessible to, control plane 210.

Capability to OSI Level Example Mapping

Capabilities of different types of network devices (one example of which is switch/router 205) that may benefit from the disclosed event ingestion management capabilities may vary greatly. Capabilities of different network devices are generally described with respect to how those capabilities map to the OSI model. A brief overview of the different layers and their typical capability mapping is provided in the next few paragraphs to provide context for this disclosure. However, no particular OSI mapping capability is required to practice the concepts of this disclosure and this information should not be considered limiting in any way. These are just sample devices that may benefit from the event ingestion management techniques and examples of types of network functionality that may be performed by devices incorporating disclosed techniques.

An Ethernet hub is an example of a simple layer 1 network device (in contrast to a switch that operates at layer 2 and router that operates at layer 3). An Ethernet hub does not manage any of the traffic coming through it. Any packet entering a port may be repeated to the output of every other port except for the port of entry. Specifically, each bit or symbol may be repeated as it flows in.

A layer 2 switch operating as a network bridge may interconnect devices in a home or office for example. The bridge may learn the MAC address of each connected device. Bridges may also buffer an incoming packet and adapt the transmission speed to that of the outgoing port. While there are specialized applications, such as storage area networks, where the input and output interfaces are the same bandwidth, this is not always the case in general LAN applications. Generally, in LANs, a switch may be used for end user access and typically concentrates lower bandwidth and uplinks into a higher bandwidth. Interconnect between switches may be regulated using spanning tree protocol (STP) that disables links so that the resulting local area network is a tree without loops. In contrast to routers, spanning tree bridges have topologies with only one active path between two points. Shortest path bridging is a layer 2 alternative to STP that allows all paths to be active with multiple equal cost paths. Information about the topologies and other information learned by a given network device represent examples of data that may be included in a historical view from a time-series monitoring of that device.

A layer-3 switch can perform some or all of the functions normally performed by a router. In some cases, network switches are limited to supporting a single type of physical network, typically Ethernet, whereas a router may support different kinds of physical networks on different ports. As mentioned above, many combination (e.g., hybrid) devices are possible and can perform a variety of functions such that they do not fit neatly into a single category of device. Regardless, of the overall capabilities of the device, the disclosed device monitoring capability may assist in troubleshooting network anomalies.

A common layer-3 capability is awareness of IP multicast through IGMP snooping. With this awareness, a layer-3 switch may increase efficiency by delivering the traffic of a multicast group only to ports where the attached device has signaled that it wants to listen to that group. Layer-3 switches typically support IP routing between VLANs configured on the switch. Some layer-3 switches support the routing protocols that routers use to exchange information about routes between networks.

While the exact meaning of the term layer-4 switch is vendor-dependent, a layer-4 switch almost always includes a capability for network address translation (NAT) and may add some type of load distribution based on Transmission Control Protocol (TCP) sessions or advanced Quality of Service (QoS) capabilities. Further, network devices may include a stateful firewall, a VPN concentrator, or be an IPSec security gateway.

Layer-7 switches may distribute the load based on uniform resource locators (URLs), or by using some installation-specific technique to recognize application-level transactions. A layer-7 switch may include a web cache and participate in a content delivery network (CDN).

Figure 3:
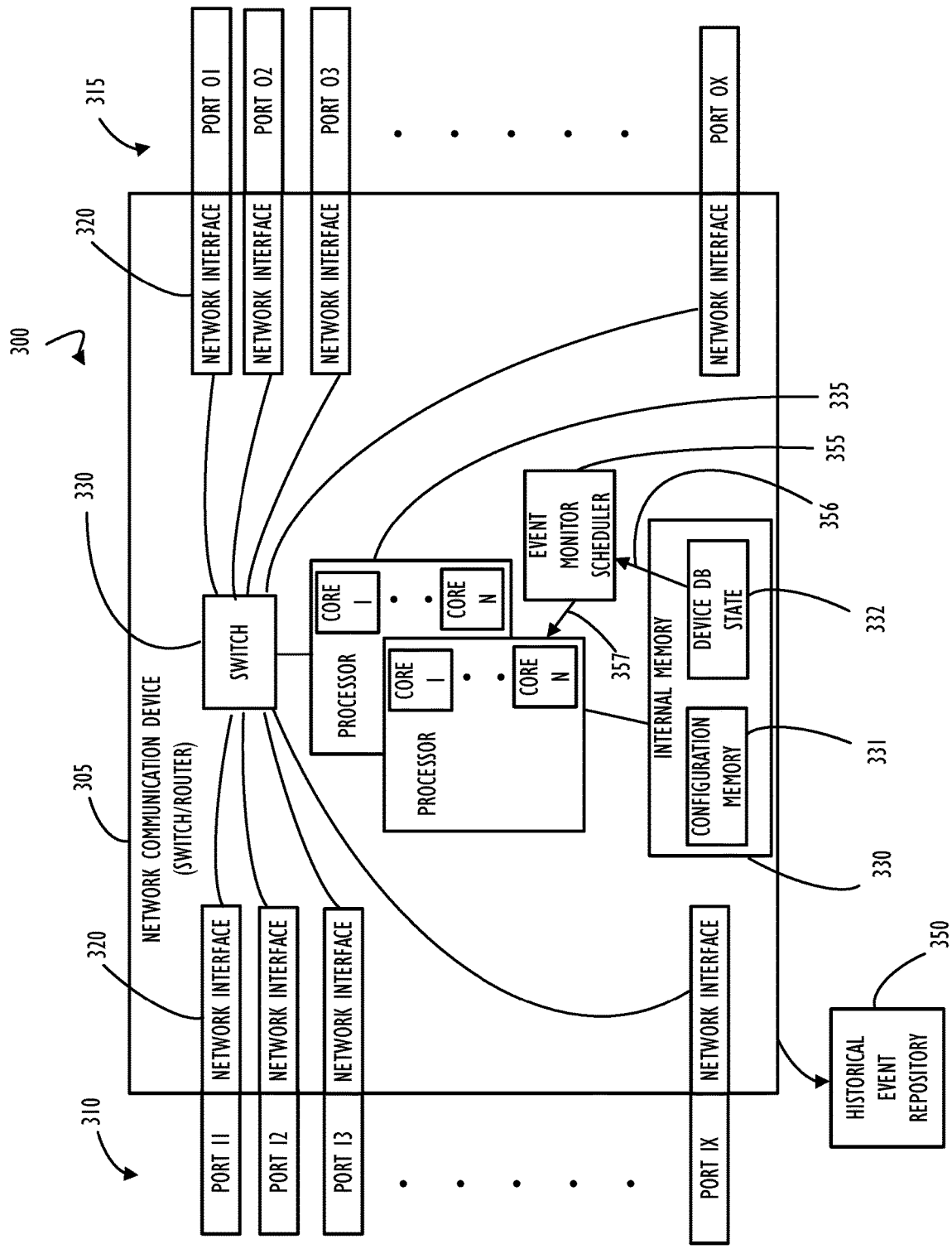
FIG. 3 is a block diagram representing a second example of a network device including an event monitor scheduler functional component, according to one or more disclosed implementations.

Referring now to FIG. 3, a simplified network communication device 305 such as a switch/router is illustrated in block diagram 300. In general, a network communication device 305 may include an internal switch 330 that communicatively connects a set of input/output ports 310 via a logical or physical network interface 320 to a set of input/output ports 315 that also have an associated logical or physical network interface 320. The communication paths established by switch 330 may be controlled by one or more processors 335 (and possibly corresponding hardware logic) and the processors 335 may obtain and store information in internal memory 330. Each of the one or more processors 335 may include any number of cores as indicated by CORE 1 through CORE N of processors 335.

Network device 305 represents a relatively basic switch or router architecture. In addition to standard components, network device 305 is illustrated to include event monitor scheduler 355 communicatively coupled to internal memory 330 and a specific portion thereof, referred to as device DB state memory 332. Event monitor scheduler may have access to all of internal memory 330, however, device DB state memory 332 is emphasized because it represents the portion of memory where the above referenced "listeners" may be configured to generate events. Of course, listeners may be able to register to listen to any memory area, but, for this example, device DB state 332 is intended to represent that logical area of memory where event generation takes place.

Also shown in FIG. 3, is historical event repository 350, that may be implemented on an external system such as a data server. Communication from network communication device 305 to historical event repository 350 may be one way as indicated by the unidirectional arrow connecting the two. This is, in part, because analysis of historical event data is expected to be analyzed on a processing device other than network communication device 305. In some implementations it may be possible to send some information from historical event repository 350 to network communication device 305, such as timing and control data, but the majority of data specifically related to monitoring is expected to be event data that is transmitted in an outbound direction from network communication device 305 when communicating with historical event repository 350.

The exchange of outbound information may be facilitated by event monitor scheduler 355 or one of the worker threads (not shown) executing on a core of one of processors 335. To minimize frequent transmission of small amounts of network traffic from network communication device 305 to historical event repository 350 some buffering may be implemented on network communication device 305. However, recall that network communication device 305 may have limited available resources so this local buffering may be optional and sometimes disabled. To facilitate buffering, periodic, responsive to filling a buffer of changes, or on demand triggers may be implemented to initiate transfer of event data from network communication device 305 to historical event repository 350.

Referring to FIG. 4, functional block diagram 400 illustrates one possible implementation of event queue processing, according to disclosed embodiments. State database 405 represented by the left-most block of diagram 400 represents a database of current device state that provides event feeds (e.g., DB state memory 332 of FIG. 3). In some implementations, and because of limited resources local to a network communication device, state database 405 may contain very limited buffering capability. For this example, implementation we can consider that there is no data buffering capability and if an event responsive to a change in data value cannot be transferred to an event processing queue prior to that data value's next change, some changes may be lost. However, in this example architecture, as long as event queues are sized larger than one entry, it may take very rapid changes to a state database 405 value for that change to be lost. Accordingly, a system administrator may take into consideration the rapidity with which a given value may be expected to change when sizing a corresponding queue for that data value.

Continuing with FIG. 4, there are shown N event queues to indicate that a total number of event queues may be determined by a configuration parameter based on monitoring goals of a system administrator for a particular network communication device. As explained above, when a data value within the state database 405, an entry may be added to a corresponding queue associated with that data value. In this example, there is a one-to-one correspondence between queues and monitored data values, however, this one-to-one correspondence is not a requirement. Accordingly, in this example, queue 1 (410) receives an entry when data value 1 (not shown) in DB 405 changes; queue 2 (411) receives an entry when data value 2 (not shown) in DB 405 changes; and similarly, for queue N-1 (415) and queue N (416).

As illustrated in FIG. 4, each of these queues are independent from each other and, as explained above, may need to be processed in a FIFO order for accurate historical analysis when disclosed techniques are used for a network communication device (e.g., network communication device 305 of FIG. 3). In cases where the disclosed event ingestion management techniques are used to throttle based on input for other types of devices, this FIFO requirement may not be in place. One of ordinary skill in the art, given the benefit of this disclosure, would understand how to make this alteration (e.g., remove FIFO restriction) without departing from the other concepts disclosed herein.

Continuing with FIG. 4, each of the illustrated event queues (410, 411, 415, and 416) interfaces with scheduler component 420. Scheduler component 420 may be implemented as a software module executing on a processor of a network communication device, may be implemented as a hardware module, or may be implemented as a combination of both hardware and software (including firmware). Details of scheduler 420 and queue processing are additionally explained below with reference to FIG. 5. As illustrated in block diagram 400, scheduler 420 feeds into ready queue 430. In this example, ready queue 430 illustrates an interface between scheduler 420 and a worker pool 440 of worker threads (not shown). As used herein, a worker thread represents a process thread executing on a core to perform work. Some implementations may not be exactly implemented as threads, but threads are used in this example for simplicity. Example worker pool 440 may have a configurable number of worker threads available to process queue entries on different cores of a processor and maintain FIFO processing order. In some implementations, there may be a single worker thread per core so worker pool 440 would be sized equal to the number of cores available for event processing (which may be less than a total number of cores). By having a pool less than the total number of cores it is guaranteed that worker threads cannot consume all compute resources of a network communication device because some cores would not have a worker thread assigned.

Figure 5:
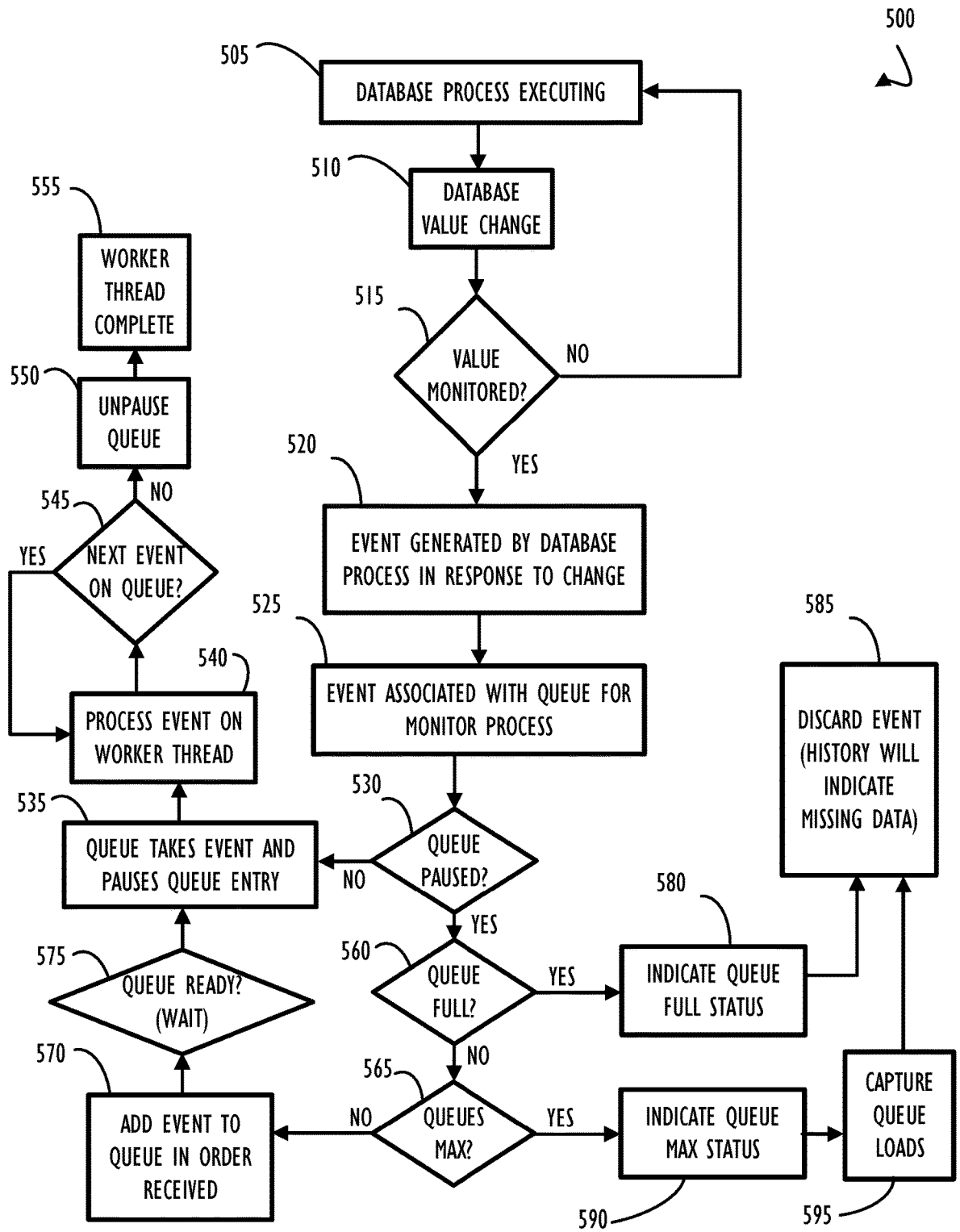
FIG. 5 is an example flowchart illustrating event generation, and corresponding queue scheduling for each generated event, as might be performed using event ingestion management techniques according to one or more disclosed implementations.

Referring to FIG. 5, there is shown a flow diagram depicting one example process 500 for event generation based on a database change, according to one or more disclosed implementations. Process 500 begins at block 505 where a database process is executing. In this example, the database process represents a control process for the database. At block 510 a database value is changed. Decision 515 indicates that if this value is monitored (e.g., has a listener registered or "listening for changes") then flow continues (the YES prong of decision 515) to block 520. If the value is not monitored (the NO prong of decision 515) the data change is made, and flow returns to block 505. At block 520, based on a monitored data value change, an event may be generated by the database process if it is involved in the listening process (e.g., through registration). In an alternative implementation, the database process may be unaware of listeners and each listener would be responsible for generating the event.

In any case, block 525 indicates that the event representing the data value change may be associated with a queue (e.g., queue 1 (410) of FIG. 4) and a corresponding monitor process. Decision 530 indicates that the associated queue for processing the event may be paused (e.g., busy or full). A queue entry may be marked busy (i.e., "paused") when it is actively being processed by a worker thread. If the associated queue entry is not busy (the NO prong of decision 530) flow continues to block 535 where the queue entry is populated with event information and that queue entry is paused (i.e., until it is processed). Alternatively, if the queue entry is paused (the YES prong of decision 530) flow continues to decision 560 where a determination as to overall queue status of the associated queue may be checked.

If, at decision 560, it is determined that the associated queue is full (the YES prong of decision 560) flow continues to block 580 where a queue full status indication may be determined. Recall, as discussed above, this may represent a first indication that throttling may need to be initiated for all monitoring. In this example, there is no additional buffering implemented so a queue full status results in flow continuing to block 585 where the event entry (and corresponding historical information about the data value change) may be discarded. As mentioned in block 585, the history may be marked to indicate missing data and this marking may take place on the repository (e.g., historical event repository 350 of FIG. 3) so as to minimize the load on the network communication device. In one implementation, each change may be given a sequence number and time stamp so that the historical event repository will understand how many data values were lost and for what approximate time period they were lost.

Returning to decision 560, if it is determined that the associated queue is not full (the NO prong of decision 560), flow continues to decision 565 where a check on the maximum queue entries across all queues may be checked. Recall, that this is a second level of throttling a monitor process on a network communication device where throttling may be initiated if the backlog across all queues is higher than the QUEUES MAX threshold. If the sum of all unprocessed entries is above the threshold (the YES prong of decision 565), flow continues to block 590 where an indication of queue max status may be determined. At block 595 a capture of all queue loads (e.g., their number of unprocessed events at the time of hitting the QUEUES MAX threshold) may be stored to allow a system administrator to further determine and adjust overall configuration settings. Flow continues to block 585 where the event may be discarded and processed as explained above.

If, at decision 560, it is determined that the queues are not above their total threshold, flow continues to block 570 where the event may be added to the associated queue to be processed in the order received. Flow continues to decision 575 where a queue ready determination may be made (e.g., a queue ready to process next event determination). Decision 575, in this example, represents a wait loop where flow will continue to block 535 upon a determination that a queue is ready to process an event. Recall, that flow also arrives at block 535 when an event entry arrives at decision 530 and the queue entry is immediately available. As illustrated in this example, resources for maintaining queue buffers may not be used until they are necessary. That is, if a monitored data value changes infrequently and can complete processing prior to the next change, the overhead of setting up a formal queue mechanism may be eliminated because there is only a single entry for an event (rather than a buffer queue of multiple events). This dynamic adjustment for event ingestion management represents an overall improvement to the processing of the network communication device because it conserves resources of the network communication devices with respect to this secondary monitoring function.

Returning to block 535, a queue entry is obtained for processing and that queue entry maintains its "paused" state (e.g., in-use, locked) until processing for it is completed (or it is discarded). Block 540 indicates that the event may be dispatched to the appropriate worker thread for processing. At completion of processing flow continues to decision 545 where it may be determined if there is another event on the queue for this worker thread to process. If there is another event to process (the YES prong of decision 545) flow returns to block 540 to process the next entry. This process may repeat with each queue entry being processed and freed (e.g., un-paused) when the monitoring processing has been completed for that queue entry. If there are no more events to be processed by this worker thread (the NO prong of decision 545), flow continues to block 550 where the entire queue may be un-paused to allow more entries to be added to that queue (e.g., at block 570). Flow then continues to block 555 where the worker thread process is complete, and it may exit or suspend from the core on which it is executing to return resources for other processing tasks of the network computer device.

Note, that there are several levels of throttling present in method 500 and different design criteria and thresholds may affect exactly how a given network communication device initiates throttling. To be clear, both a queue entry and an entire queue may be paused. If a queue entry is paused that means that it contains unprocessed data. If an entire queue is paused that means that it has been determined to process that queues complete backlog prior to accepting any new queue entries. Further, if the sum of all unprocessed entries across all queues is greater than a configurable threshold (e.g., QUEUES MAX), then no more entries for any queue may be accepted until the overall backlog is reduced to an acceptable level. To reduce complexity, this last point is not illustrated in example flow 500 but could be implemented in many different ways. For example, the passing of the QUEUES MAX threshold could be a globally accessible "flag" value that is set and reset as needed. The database process or each listener process would then check this flag prior to initiating another queue entry. Thus, processing at decision 515 would always return through the "NO" prong as if monitoring was not active for any values. Other implementations are possible.

It should be clear that the disclosed event ingestion management techniques allow for monitoring and collection of historical data when there are enough resources on the network communication device to perform this function. However, when there is a backlog (which is likely the result of unavailable resources or other problem with the monitoring) then the monitoring function is throttled (or terminated). For example, if there is a problem and queues are not being processed properly, further events are discarded (e.g., block 585).

Figure 6:
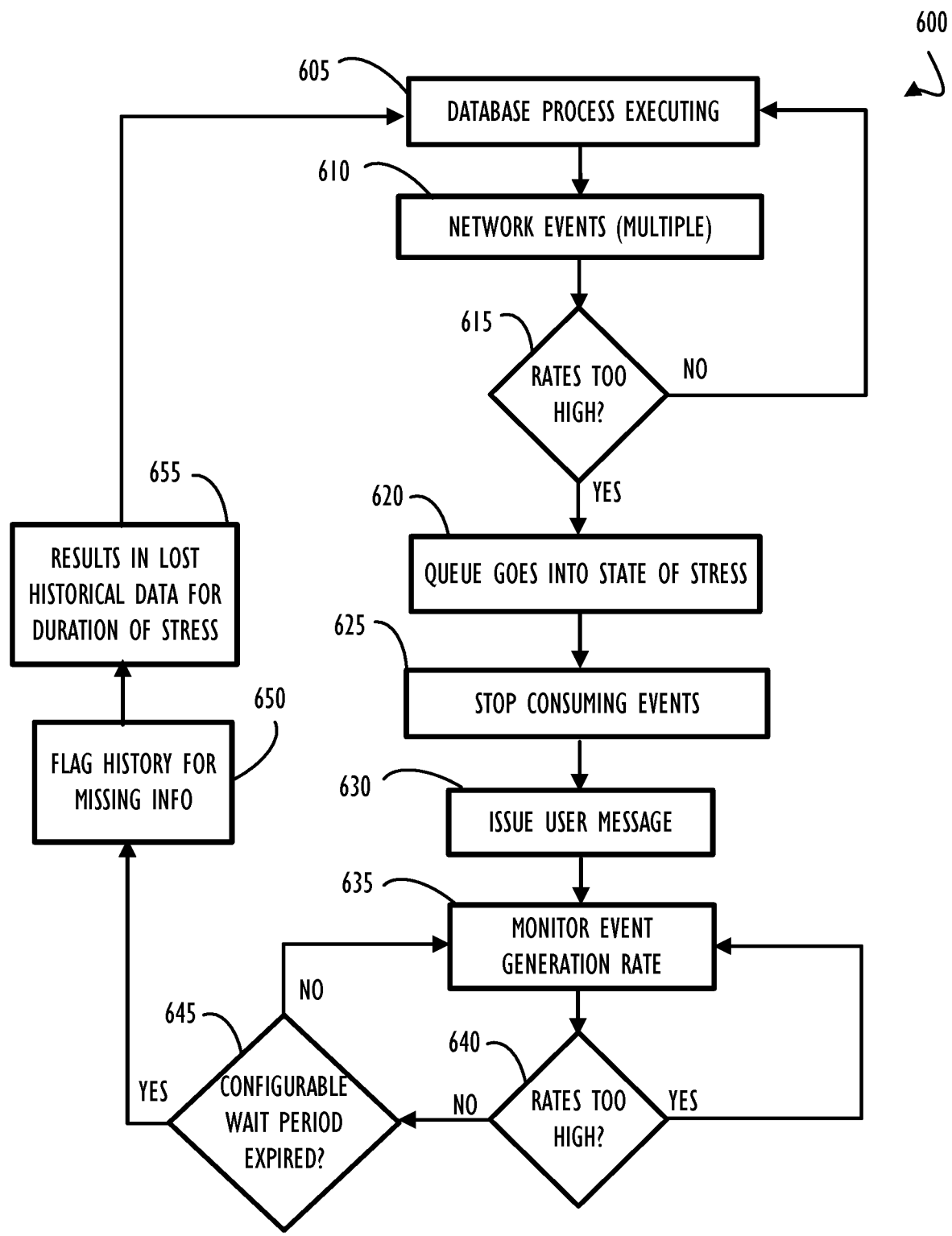
FIG. 6 is an example flowchart illustrating a state of stress and corresponding actions that might be taken while in a stress condition, according to one or more disclosed implementations.

Referring to FIG. 6, there is shown a flow diagram illustrating a state of stress and corresponding actions (e.g., throttling of events) that might be taken while in a stress condition, according to one or more disclosed implementations. Process 600 begins at block 605 where a database process is executing (see block 505 of FIG. 5). At block 610 there are multiple network events that may be in a backlog with respect to processing or may have been generated in a burst. For example, if some significant real-world event happens to a network (e.g., loss of router, power-fail, etc.) then there may be a lot of administrative traffic on the network for a period of time while the devices of the network (including a monitored network communication device like 305 of FIG. 3) attempt to maintain availability of the network in support of end-user machines and servers. That is, the network may adjust routes and other network parameters to perform its function based on the new configuration (e.g., without one or more failed devices). Other real-world events may also cause bursts of events. In any case, Decision 615 indicates that a determination regarding arrival rate of events may be made at the network communication device (e.g., device equipped with the disclosed event ingestion management techniques). If the rate is not too high (the NO prong of decision 615) flow returns to block 605 for normal processing. However, If the rate is too high (the YES prong of decision 615) then flow may continue to block 620 where one or more (or all) queues go into a state of stress. In response to this stress condition, block 625 indicates that no further events (e.g., with respect to a monitor function) may be consumed. Block 630 indicates that a user message may be issued to inform the user of the state of stress. For example, an entry may be placed in a log, a user alert may be initiated, or some other action may take place to convey this information and provide an indication that monitoring has be turned off (for at least a period of time).

Continuing with FIG. 6, flow continues to block 635 where event generation rates may be monitored (e.g., periodically checked). At decision 640 a determination as to a current arrival rate may be made. If the arrival rate is still too high (the YES prong of decision 640) then flow returns to block 635 where another wait period and subsequent check may be performed. However, if the arrival rate has declined (the NO prong of decision 640) flow continues to decision 645 where a determination may be made to check if the arrival rate has been low enough for a configurable period of time. For example, after a condition of stress a system administrator may not want to resume monitoring for a period of 5 minutes to allow further stabilization of the network after stress. If adequate time has not elapsed, flow returns to block 635 where another wait period and subsequent check may be performed. However, if enough time has passed (the YES prong of decision 645), flow continues to block 650 where historical information may be flagged to identify that a period of data may be missing (e.g., because monitoring was turned off for a period of time). Flow then continues to block 655 to indicate that the overall result of this process flow may be that there was lost data for the duration of stress (plus configurable wait period). Flow then returns to block 605 where the database process may be executing, and monitoring may be in effect again.

Figure 7:
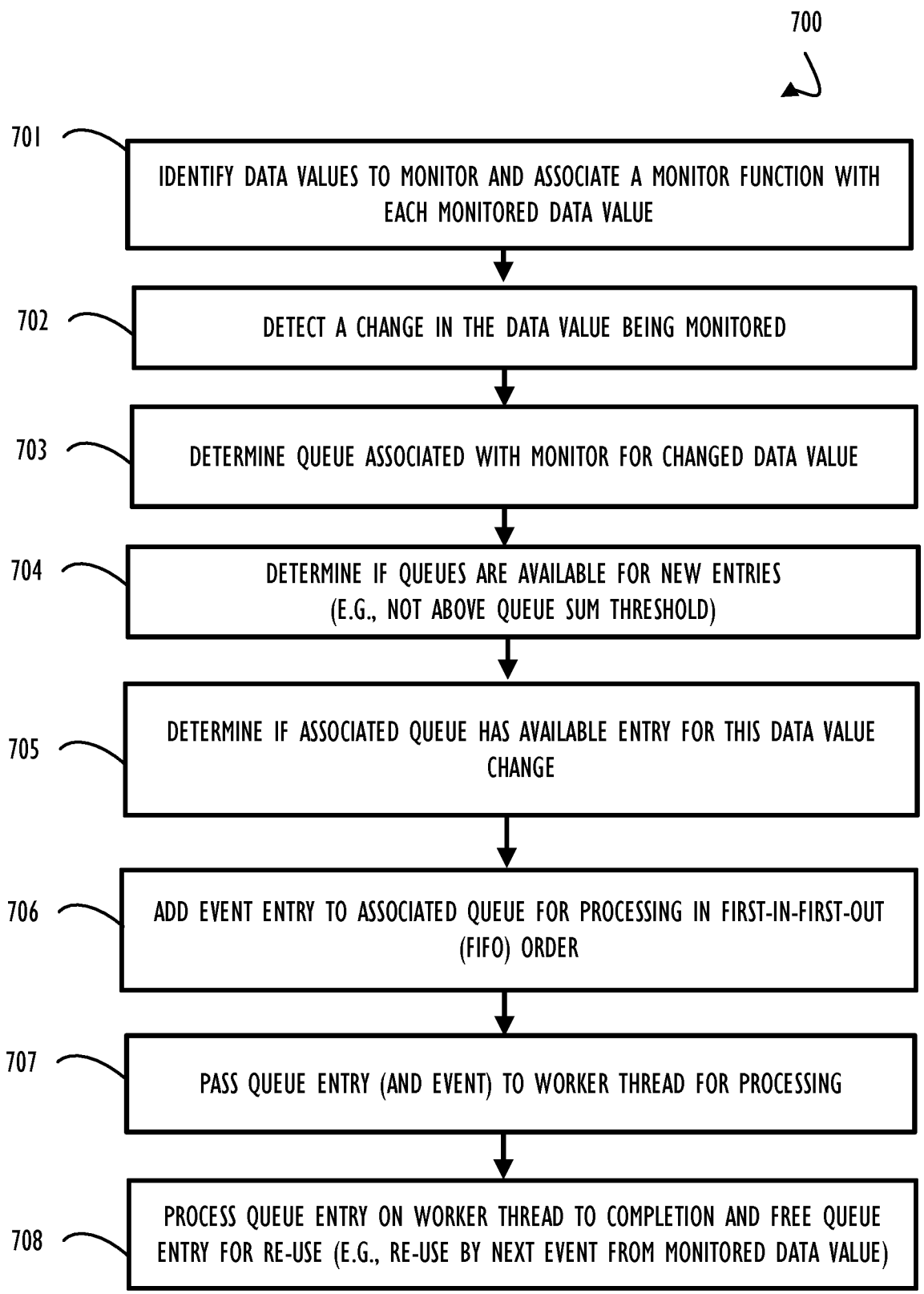
FIG. 7 is an example method that may be performed within a computer network environment on one or more network communication devices to perform event ingestion management techniques, according to one or more disclosed implementations.

FIG. 7 illustrates an example method 700 that may be used to perform event ingestion management techniques on a network communication device, according to one or more disclosed embodiments. Example method 700 begins at block 701 where associations between data values and monitors may be established. These associations may be established programmatically and may be established based on interaction with a system administrator defining a monitoring strategy for a network communication device (e.g., network communication device 305 of FIG. 3). Block 702 indicates that a data change may be detected for a data value being monitored. As explained above, data detection may be a function of the database control process and/or a listener function executing on a network communication device where monitoring is implemented. Block 703 indicates that a determination of a queue association with the monitored data value may be made. Block 704 indicates that a determination may be made (e.g., by a listener process or a queue management process) as to if more queue entries are allowed at this time based on an overall backlog of queue entries (e.g., entries not yet processed). Block 705 indicates that if more queue entries are allowed, a second determination based on a particular queue may be made to see if that particular queue is able to accept more entries. Block 706 indicates that, if more entries are allowed, a queue entry may be added to the appropriate queue for processing the detected data change as an event. Block 707 indicates that the queue entry may make its way, for example, via a scheduler function such as scheduler 420 of FIG. 4, to a worker thread for processing. Finally, block 708 indicates that the worker thread may process the queue entry to completion and free that queue entry for re-use by a subsequent event for a change to this same data value or another data value.

Figure 8:
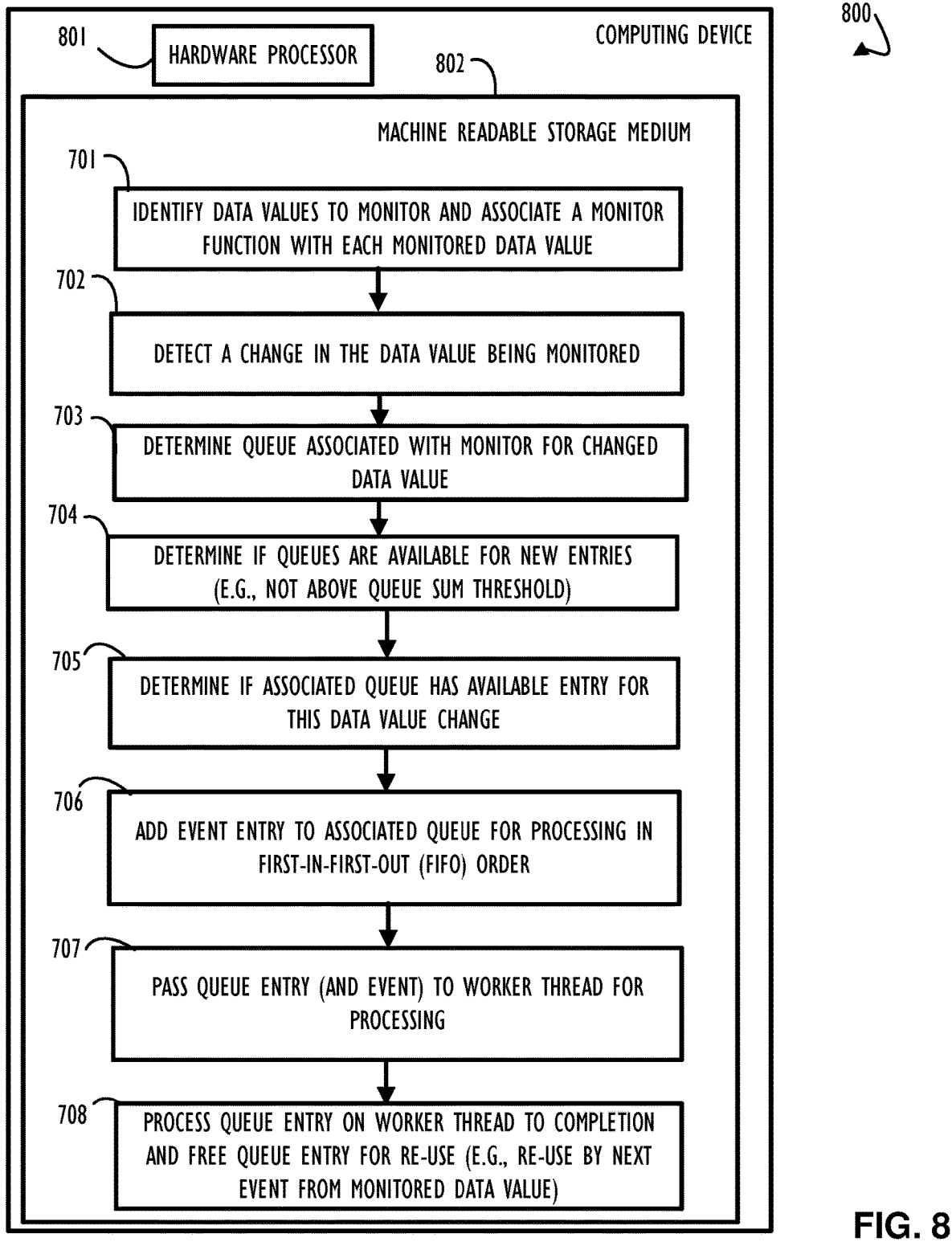
FIG. 8 is an example computing device with a hardware processor and accessible machine-readable instructions that might be used for performing event ingestion management techniques, according to one or more disclosed example implementations.

FIG. 8 is an example computing device 800, with a hardware processor 801, and accessible machine-readable instructions stored on a machine-readable medium 802 for performing dynamically adjustable precision for different stages of a multi-stage compute process, according to one or more disclosed example implementations. FIG. 8 illustrates computing device 800 configured to perform the flow of method 700 as an example. However, computing device 800 may also be configured to perform the flow of other methods, techniques, functions, or processes described in this disclosure. In this example of FIG. 8, machine-readable storage medium 802 includes instructions to cause hardware processor 801 to perform blocks 701-707 discussed above with reference to FIG. 7.

A machine-readable storage medium, such as 802 of FIG. 8, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 9:
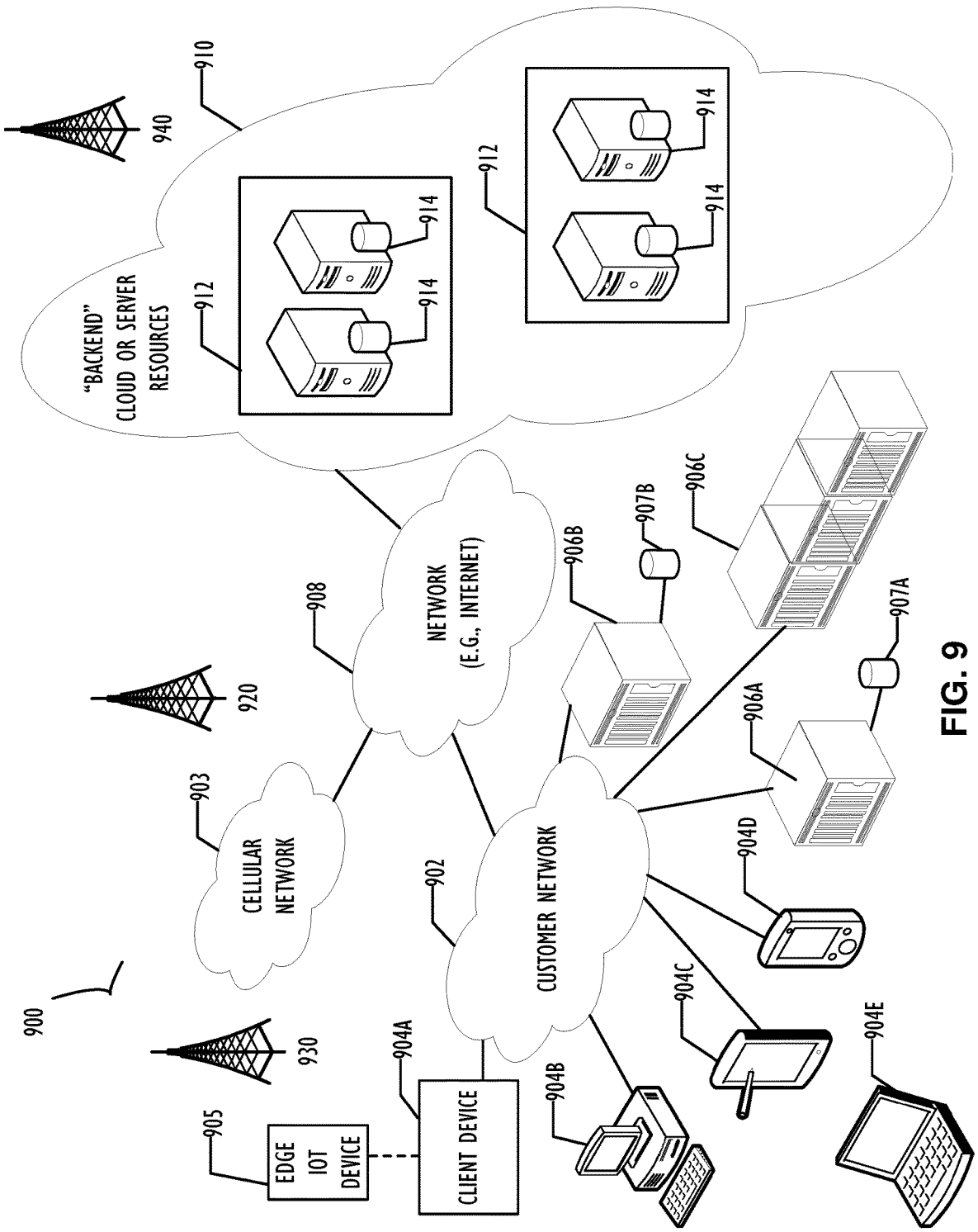
FIG. 9 represents a computer network infrastructure that may be used to implement all or part of the disclosed event ingestion management techniques, according to one or more disclosed implementations.
Figure 10:
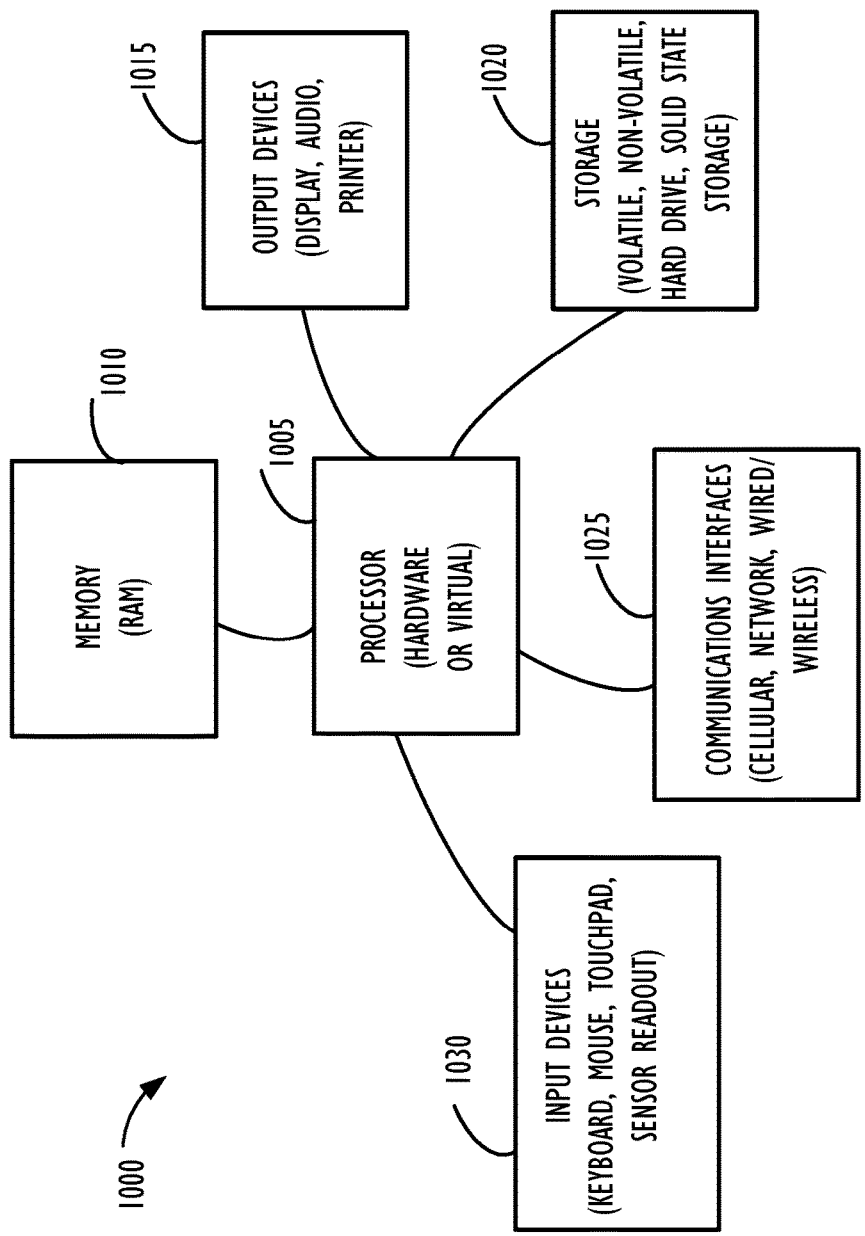
FIG. 10 illustrates a computer processing device that may be used to implement the functions, modules, processing platforms, execution platforms, communication devices, and other methods and processes of this disclosure.

FIG. 9 represents a computer network infrastructure that may be used to implement all or part of the disclosed event ingestion management techniques, according to one or more disclosed implementations.

FIG. 9 represents a computer network infrastructure 900 that may be used to implement all or part of the disclosed event ingestion management techniques, according to one or more disclosed embodiment. Network infrastructure 900 includes a set of networks where embodiments of the present disclosure may operate. Network infrastructure 900 comprises a customer network 902, network 908, cellular network 903, and a cloud service provider network 910. In one embodiment, the customer network 902 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another embodiment, customer network 902 represents an enterprise network that could include or be communicatively coupled to one or more local area networks (LANs), virtual networks, data centers and/or other remote networks (e.g., 908, 910). In the context of the present disclosure, customer network 902 may include multiple devices configured with the disclosed event ingestion management techniques such as those described above. Also, one of the many computer storage resources in customer network 902 (or other networks shown) may be configured to store the historical event repository 350 of FIG. 3.

As shown in FIG. 9, customer network 902 may be connected to one or more client devices 904A-E and allow the client devices 904A-E to communicate with each other and/or with cloud service provider network 910, via network 908 (e.g., Internet). Client devices 904A-E may be computing systems such as desktop computer 904B, tablet computer 904C, mobile phone 904D, laptop computer (shown as wireless) 904E, and/or other types of computing systems generically shown as client device 904A.

Network infrastructure 900 may also include other types of devices generally referred to as Internet of Things (IoT) (e.g., edge IOT device 905) that may be configured to send and receive information via a network to access cloud computing services or interact with a remote web browser application (e.g., to receive configuration information).

FIG. 9 also illustrates that customer network 902 includes local compute resources 906A-C that may include a server, access point, router, or other device configured to provide for local computational resources and/or facilitate communication amongst networks and devices. For example, local compute resources 906A-C may be one or more physical local hardware devices, such as the different configurations of NN processing systems outlined above. Local compute resources 906A-C may also facilitate communication between other external applications, data sources (e.g., 907A and 907B), and services, and customer network 902. Local compute resource 906C illustrates a possible processing system cluster with three nodes. Of course, any number of nodes is possible, but three are shown in this example for illustrative purposes.

Network infrastructure 900 also includes cellular network 903 for use with mobile communication devices. Mobile cellular networks support mobile phones and many other types of mobile devices such as laptops etc. Mobile devices in network infrastructure 900 are illustrated as mobile phone 904D, laptop computer 904E, and tablet computer 904C. A mobile device such as mobile phone 904D may interact with one or more mobile provider networks as the mobile device moves, typically interacting with a plurality of mobile network towers 920, 930, and 940 for connecting to the cellular network 903. In the context of the current monitoring and event ingestion management, user alerts as to initiating of throttling actions may be configured to provide an end-user notification. In some implementations, this notification may be provided through network infrastructure 900 directly to a system administrators cellular phone.

Although referred to as a cellular network in FIG. 9, a mobile device may interact with towers of more than one provider network, as well as with multiple non-cellular devices such as wireless access points and routers (e.g., local compute resources 906A-C). In addition, the mobile devices may interact with other mobile devices or with non-mobile devices such as desktop computer 904B and various types of client device 904A for desired services. Although not specifically illustrated in FIG. 9, customer network 902 may also include a dedicated network device (e.g., gateway or router) or a combination of network devices (not shown) that implement a customer firewall or intrusion protection system. These types of devices may be configured to provide an interface to an event management processing and throttling system of this disclosure.

FIG. 9 illustrates that customer network 902 is coupled to a network 908. Network 908 may include one or more computing networks available today, such as other LANs, wide area networks (WAN), the Internet, and/or other remote networks, in order to transfer data between client devices 904A-D and cloud service provider network 910. Each of the computing networks within network 908 may contain wired and/or wireless programmable devices that operate in the electrical and/or optical domain.

In FIG. 9, cloud service provider network 910 is illustrated as a remote network (e.g., a cloud network) that is able to communicate with client devices 904A-E via customer network 902 and network 908. The cloud service provider network 910 acts as a platform that provides additional computing resources to the client devices 904A-E and/or customer network 902. In one embodiment, cloud service provider network 910 includes one or more data centers 912 with one or more server instances 914.

FIG. 10 illustrates a computer processing device 1000 that may be used to implement the functions, modules, processing platforms, execution platforms, communication devices, and other methods and processes of this disclosure. For example, computing device 1000 illustrated in FIG. 10 could represent a client device or a physical server device and include either hardware or virtual processor(s) depending on the level of abstraction of the computing device. In some instances (without abstraction), computing device 1000 and its elements, as shown in FIG. 10, each relate to physical hardware. Alternatively, in some instances one, more, or all of the elements could be implemented using emulators or virtual machines as levels of abstraction. In any case, no matter how many levels of abstraction away from the physical hardware, computing device 1000 at its lowest level may be implemented on physical hardware.

As also shown in FIG. 10, computing device 1000 may include one or more input devices 1030, such as a keyboard, mouse, touchpad, or sensor readout (e.g., biometric scanner) and one or more output devices 1015, such as displays, speakers for audio, or printers. Some devices may be configured as input/output devices also (e.g., a network interface or touchscreen display).

Computing device 1000 may also include communications interfaces 1025, such as a network communication unit that could include a wired communication component and/or a wireless communications component, which may be communicatively coupled to processor 1005. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 10, computing device 1000 includes a processing element such as processor 1005 that contains one or more hardware processors, where each hardware processor may have a single or multiple processor cores. In one embodiment, the processor 1005 may include at least one shared cache that stores data (e.g., computing instructions) that are utilized by one or more other components of processor 1005. For example, the shared cache may be a locally cached data stored in a memory for faster access by components of the processing elements that make up processor 1005. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 10, the processing elements that make up processor 1005 may also include one or more of other types of hardware processing components, such as graphics processing units (GPU), application specific integrated circuits (ASICs), field-programmable gate arrays (FPGAs), and/or digital signal processors (DSPs).

FIG. 10 illustrates that memory 1010 may be operatively and communicatively coupled to processor 1005. Memory 1010 may be a non-transitory medium configured to store various types of data. For example, memory 1010 may include one or more storage devices 1020 that comprise a non-volatile storage device and/or volatile memory. Volatile memory, such as random-access memory (RAM), can be any suitable non-permanent storage device. The non-volatile storage devices 1020 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 1020 may be used to store overflow data if allocated RAM is not large enough to hold all working data. The non-volatile storage devices 1020 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 1005. In one embodiment, the compiling process of the software program may transform program code written in a programming language to another computer language such that the processor 1005 is able to execute the programming code. For example, the compiling process of the software program may generate an executable program that provides encoded instructions (e.g., machine code instructions) for processor 1005 to accomplish specific, non-generic, particular computing functions.

After the compiling process, the encoded instructions may then be loaded as computer executable instructions or process steps to processor 1005 from storage device 1020, from memory 1010, and/or embedded within processor 1005 (e.g., via a cache or on-board ROM). Processor 1005 may be configured to execute the stored instructions or process steps in order to perform instructions or process steps to transform the computing device into a non-generic, particular, specially programmed machine or apparatus. Stored data, e.g., data stored by a storage device 1020, may be accessed by processor 1005 during the execution of computer executable instructions or process steps to instruct one or more components within the computing device 1000.

A user interface (e.g., output devices 1015 and input devices 1030) can include a display, positional input device (such as a mouse, touchpad, touchscreen, or the like), keyboard, or other forms of user input and output devices.

The user interface components may be communicatively coupled to processor 1005. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 1000 may comprise other components well known in the art, such as sensors, powers sources, and/or analog-to-digital converters, not explicitly shown in FIG. 10.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A non-transitory computer readable medium comprising computer executable instructions stored thereon that when executed by one or more processing units, cause the one or more processing units to perform a method to provide event ingestion throttling, the method comprising:
   obtaining an event associated with a first event queue from a plurality of event queues on a network communication device executing a service function and a monitoring function, the event responsive to a local database change on the network communication device, the first event queue associated with the monitoring function, the service function having a higher priority for the network communication device than the monitoring function;
   determining if an event queue entry is available for the first event queue;
   based on a determination that no event queue entry is available, determining if the first event queue is full;
   based on a determination that the first event queue is full, setting a first indication to initiate throttling of events;
   determining if a total of in-use queue entries across the plurality of event queues is higher than a threshold;
   based on a determination that the total of in-use queue entries is above the threshold, setting a second indication to initiate throttling of events; and
   providing the first indication and the second indication to an event scheduler monitor function, wherein the event scheduler monitor function determines whether or not to initiate throttling of events for the monitor function in favor of the service function based on a combination of the first indication and the second indication.

2. The non-transitory computer readable medium of claim 1, wherein the event scheduler monitor function determines to throttle events for the first event queue based on only the second indication to initiate throttling and the first indication to initiate throttling is not set.

3. The non-transitory computer readable medium of claim 2, wherein throttling events for the first event queue comprises rejecting further event queue entries for the first event queue at least until all pending entries in the first event queue have been processed and the first event queue is empty.

4. The non-transitory computer readable medium of claim 3, wherein throttling events is maintained for a configurable period of time after the first event queue is empty.

5. The non-transitory computer readable medium of claim 2, wherein throttling events for the first event queue comprises rejecting further event queue entries for the first event queue at least until sufficient pending queue entries across the plurality of event queues have been processed to cause the total of all in-use queue entries to be less than the threshold.

6. The non-transitory computer readable medium of claim 5, wherein throttling events is maintained for a configurable period of time after the total of all in-use queue entries is less than the threshold.

7. The non-transitory computer readable medium of claim 1,
   wherein the event scheduler monitor function determines to throttle all events for the plurality of event queues based on both the first indication and the second indication;
   wherein throttling events is maintained for a configurable period of time after the total of all in-use queue entries is less than the threshold; and
   wherein throttling events is maintained for a configurable period of time after the first event queue is empty.

8. The non-transitory computer readable medium of claim 1,
   wherein the plurality of event queues are associated with the monitoring function and each of the plurality of event queues have entries processed by a worker thread executing on a core of the one or more processing units; and
   wherein a first-in-first-out (FIFO) processing order is maintained for the each of the plurality of event queues.

9. The non-transitory computer readable medium of claim 8,
   wherein the event monitor scheduler function prioritizes processing of the first event queue over a second event queue of the plurality of event queues.

10. The non-transitory computer readable medium of claim 9,
    wherein prioritizing the first event queue over the second event queue comprises assigning a first worker thread associated with the first event queue to a first core and assigning a second worker thread associated with the second event queue to a second core based on the first core having a greater amount of idle time over a selected period of time than the second core.

11. A computer-implemented method comprising:
    identifying a monitoring function as having a lower priority than a service function on a network communication device, the service function relating to processing network traffic;
    obtaining an event associated with a first event queue from a plurality of event queues associated with the monitoring function on the network communication device, the event responsive to a local database change on the network communication device;

determining if an event queue entry is available for the first event queue;

based on a determination that no event queue entry is available, determining if the first event queue is full;

based on a determination that the first event queue is full, setting a first indication to initiate throttling of events;

determining if a total of in-use queue entries across the plurality of event queues is higher than a threshold;

based on a determination that the total of in-use queue entries is above the threshold, setting a second indication to initiate throttling of events; and providing the first indication and the second indication to an event scheduler monitor function, wherein the event scheduler monitor function determines whether or not to initiate throttling of events for the monitor function in favor of the service function based on a combination of the first indication and the second indication.

12. The computer-implemented method of claim 11, wherein the event scheduler monitor function determines to throttle all events for the plurality of event queues based on both the first indication and the second indication;

wherein throttling events is maintained for a configurable period of time after the total of all in-use queue entries is less than the threshold; and wherein throttling events is maintained for a configurable period of time after the first event queue is empty.

13. The computer-implemented method of claim 11, wherein the plurality of event queues are associated with the monitoring function and each of the plurality of event queues have entries processed by a worker thread executing on a core of the one or more processing units; and wherein a first-in-first-out (FIFO) processing order is maintained for the each of the plurality of event queues.

14. The computer-implemented method of claim 13, wherein the event monitor scheduler function prioritizes processing of the first event queue over a second event queue of the plurality of event queues.

15. The computer-implemented method of claim 14, wherein prioritizing the first event queue over the second event queue comprises assigning a first worker thread associated with the first event queue to a first core and assigning a second worker thread associated with the second event queue to a second core based on the first core having a greater amount of idle time over a selected period of time than the second core.

16. A network communication device, comprising:
one or more processing units having multiple cores;
a first memory storing a local database representing state information about the computer device; and
a second memory storing instructions, that when executed by the one or more processing units, cause the one or more processing units to provide an event ingestion throttling method, the method comprising:
identifying a monitoring function as having a lower priority than a service function on the network communication device, the service function relating to processing network traffic;

obtaining an event associated with a first event queue from a plurality of event queues associated with the monitoring function on the network communication device, the event responsive to a change in the local database;

determining if an event queue entry is available for the first event queue;

based on a determination that no event queue entry is available, determining if the first event queue is full;

based on a determination that the first event queue is full, setting a first indication to initiate throttling of events;

determining if a total of in-use queue entries across the plurality of event queues is higher than a threshold;

based on a determination that the total of in-use queue entries is above the threshold, setting a second indication to initiate throttling of events; and providing the first indication and the second indication to an event scheduler monitor function, wherein the event scheduler monitor function determines whether or not to initiate throttling of events for the monitor function in favor of the service function based on a combination of the first indication and the second indication.

17. The network communication device of claim 16, wherein the event scheduler monitor function determines to throttle all events for the plurality of event queues based on both the first indication and the second indication;

wherein throttling events is maintained for a configurable period of time after the total of all in-use queue entries is less than the threshold; and wherein throttling events is maintained for a configurable period of time after the first event queue is empty.

18. The network communication device of claim 16, wherein the plurality of event queues are associated with the monitoring function and each of the plurality of event queues have entries processed by a worker thread executing on a core of the one or more processing units; and wherein a first-in-first-out (FIFO) processing order is maintained for the each of the plurality of event queues.

19. The network communication device of claim 18, wherein the event monitor scheduler function prioritizes processing of the first event queue over a second event queue of the plurality of event queues.

20. The network communication device of claim 19, wherein prioritizing the first event queue over the second event queue comprises assigning a first worker thread associated with the first event queue to a first core and assigning a second worker thread associated with the second event queue to a second core based on the first core having a greater amount of idle time over a selected period of time than the second core.

* * * * *